United States Patent
Ali et al.

(10) Patent No.: US 12,489,276 B2
(45) Date of Patent: Dec. 2, 2025

(54) RADIATION-EMITTING DEVICE

(71) Applicant: ams-OSRAM International GmbH, Regensburg (DE)

(72) Inventors: Muhammad Ali, Devon (GB); Alfred Lell, Maxhuette-Haidhof (DE); Harald Koenig, Bernhardswald (DE)

(73) Assignee: ams-OSRAM International GmbH, Regensburg (DE)

( * ) Notice: Subject to any disclaimer, the term of this patent is extended or adjusted under 35 U.S.C. 154(b) by 699 days.

(21) Appl. No.: 17/799,284

(22) PCT Filed: Feb. 16, 2021

(86) PCT No.: PCT/EP2021/053787
§ 371 (c)(1),
(2) Date: Aug. 12, 2022

(87) PCT Pub. No.: WO2021/165269
PCT Pub. Date: Aug. 26, 2021

(65) Prior Publication Data
US 2023/0080542 A1     Mar. 16, 2023

(30) Foreign Application Priority Data
Feb. 19, 2020  (DE) .................. 10 2020 104 377.5

(51) Int. Cl.
*H01S 5/00*      (2006.01)
*H01S 5/0225*    (2021.01)
(Continued)

(52) U.S. Cl.
CPC .......... *H01S 5/4087* (2013.01); *H01S 5/0087* (2021.01); *H01S 5/0225* (2021.01);
(Continued)

(58) Field of Classification Search
CPC .... H01S 5/4087; H01S 5/0087; H01S 5/0225; H01S 5/02325; H01S 5/02326;
(Continued)

(56) References Cited

U.S. PATENT DOCUMENTS 8,073,300 B2 * 12/2011 Harle ................... G01M 11/088
                                                      385/127
2003/0138021 A1 * 7/2003 Hodgson ............... H01S 3/0941
                                                       372/75

(Continued)

FOREIGN PATENT DOCUMENTS

| DE | 102017108698 A1 | 10/2018 |
| DE | 102017121480 A1 | 3/2019 |
| WO | 2017119313 A1 | 7/2017 |

OTHER PUBLICATIONS

International Search Report issued for the corresponding International Application No. PCT/EP2021/053787, dated Jul. 13, 2021, 8 pages (only for informational purposes).

(Continued)

*Primary Examiner* — Kinam Park
(74) *Attorney, Agent, or Firm* — Viering, Jentschura & Partner mbB

(57) ABSTRACT

In at least one embodiment, the radiation-emitting device comprises a laser bar for emitting laser radiation. The device further includes a waveguide having a core, a cladding, an entry face, and an exit face. The device may include a heat sink having a mounting side where the waveguide is applied thereon, the cladding being arranged at least above and below the core in relation to the mounting side. The device may be configured so that, during operation, the laser radiation impinges on the entry face of the waveguide and passes from there into the core. The core may include a conversion element configured to convert the laser radiation into secondary radiation. The waveguide may be configured (Continued)

to guide the laser radiation and/or the secondary radiation inside the core as far as the exit face by reflection at the interface between the cladding and the core.

18 Claims, 8 Drawing Sheets

(51) Int. Cl.
    *H01S 5/02325*     (2021.01)
    *H01S 5/02326*     (2021.01)
    *H01S 5/024*     (2006.01)
    *H01S 5/323*     (2006.01)
    *H01S 5/40*     (2006.01)
    *G02B 6/42*     (2006.01)

(52) U.S. Cl.
    CPC ...... *H01S 5/02325* (2021.01); *H01S 5/02326* (2021.01); *H01S 5/02438* (2013.01); *H01S 5/02469* (2013.01); *H01S 5/32341* (2013.01); *G02B 6/4269* (2013.01); *G02B 6/4296* (2013.01)

(58) Field of Classification Search
    CPC ............. H01S 5/02438; H01S 5/02469; H01S 5/32341; G02B 6/4269; G02B 6/4296
    See application file for complete search history.

(56) References Cited

U.S. PATENT DOCUMENTS

| | | | |
|---|---|---|---|
| 2010/0066254 A1* | 3/2010 | Ott | G02B 6/0003 315/129 |
| 2020/0259309 A1 | 8/2020 | Lell et al. | |
| 2021/0090596 A1* | 3/2021 | Habibi | G11B 5/4866 |

OTHER PUBLICATIONS

German Search Report issued for the corresponding German Application No. 10 2020 104 377.5, dated Nov. 12, 2020, 5 pages (only for informational purposes).

* cited by examiner

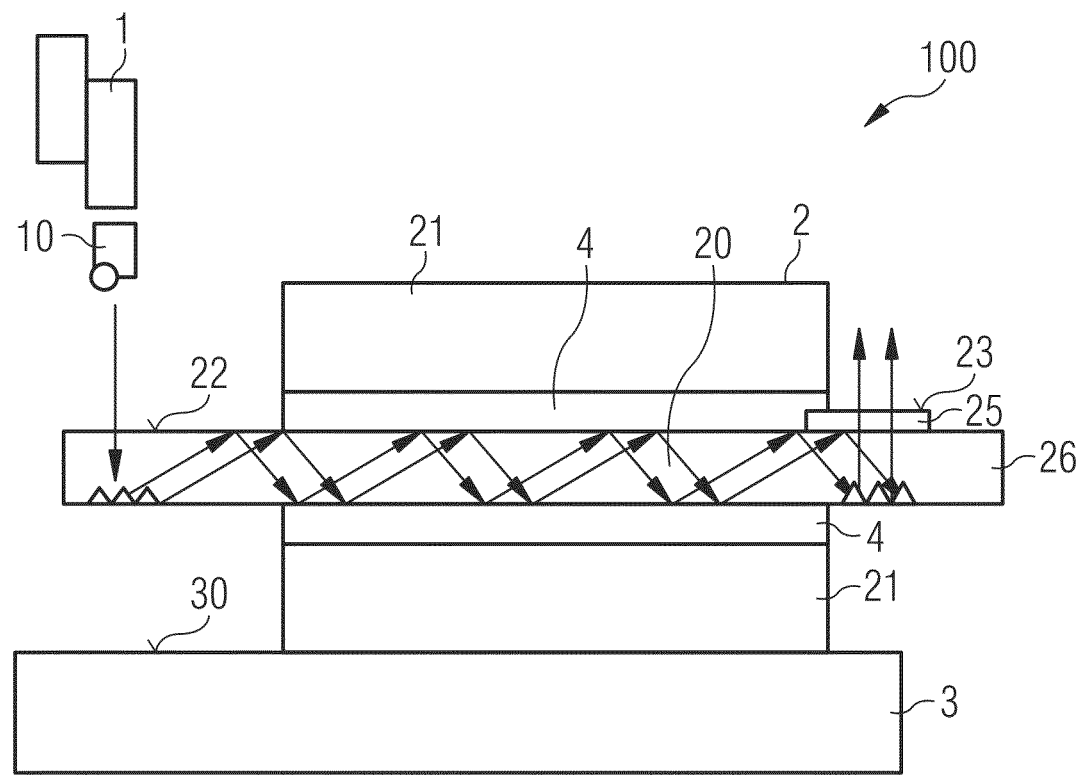
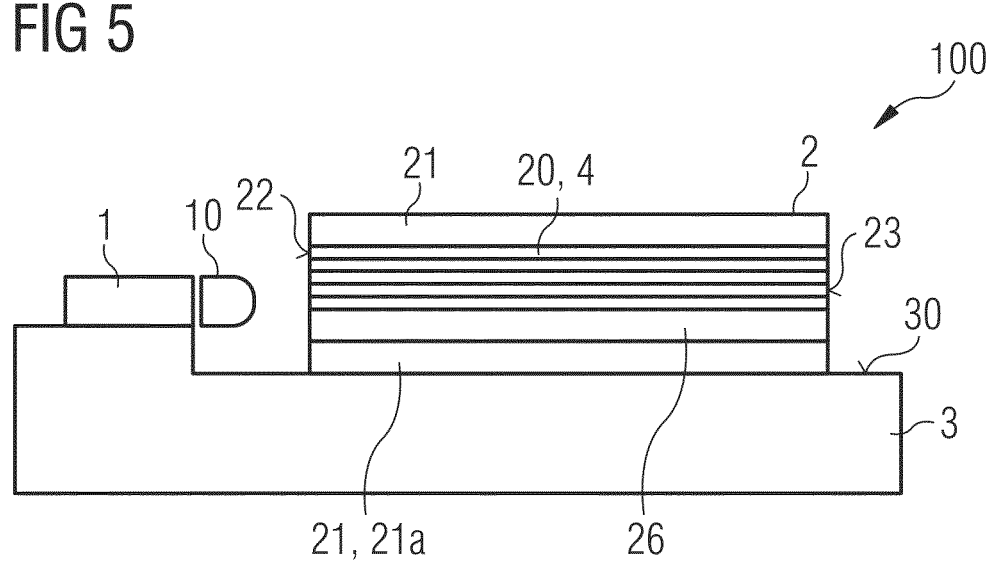

RADIATION-EMITTING DEVICE

CROSS-REFERENCE TO RELATED APPLICATIONS

The present application is a national stage entry according to 35 U.S.C. § 371 of PCT application No.: PCT/EP2021/053787 filed on Feb. 16, 2021; which claims priority to German Patent application No.: 10 2020 104 377.5, filed on Feb. 19, 2020; all of which are incorporated herein by reference in their entirety and for all purposes.

TECHNICAL FIELD

A radiation-emitting device is provided.

BACKGROUND

An object to be achieved is to provide a radiation-emitting device having a high luminance.

SUMMARY

According to at least one embodiment, the radiation-emitting device comprises a laser bar for emitting laser radiation. The laser bar comprises a multiplicity of individual emitters, or laser diodes. During intended operation of the laser bar, the individual emitters respectively emit laser radiation. The individual emitters may be operated in parallel, or simultaneously.

The laser bar comprises a semiconductor body having an active layer. Each of the individual emitters comprises a biuniquely assigned region of the semiconductor body and a biuniquely assigned section of the active layer. The semiconductor body may be formed continuously. That is to say, the individual emitters are all assigned to the same semiconductor body. The active layer of the semiconductor body may be continuous or segmented. The laser bar may be an edge-emitting laser bar. The laser bar is, in particular, a semiconductor chip.

The semiconductor body of the laser bar is based, for example, on a III-V compound semiconductor material. In particular, the semiconductor body comprises a layer sequence consisting of layers of such a semiconductor material, which are for example epitaxially grown on one another. The semiconductor material is for example a nitride compound semiconductor material such as $Al_nIn_{1-n-m}Ga_mN$, or a phosphide compound semiconductor material such as $Al_nIn_{1-n-m}Ga_mP$, or an arsenide compound semiconductor material such as $Al_nIn_{1-n-m}Ga_mAs$ or $Al_nIn_{1-n-m}Ga_mP$, respectively with $0 \leq n \leq 1$, $0 \leq m \leq 1$ and $m+n \leq 1$. In this case, the semiconductor body may comprise dopants and additional constituents. For the sake of simplicity, however, only the essential constituents of the crystal lattice of the semiconductor body, i.e. Al, As, Ga, In, N or P, are indicated, even though they may be partially replaced and/or supplemented with small amounts of further substances. In an embodiment, the semiconductor body is based on AlInGaN.

The active layer of the semiconductor body contains, in particular, at least one pn junction and/or at least one quantum well structure in the form of a single quantum well, abbreviated to SQW, or in the form of a multiple quantum well structure, abbreviated to MQW.

During intended operation, the active layer may generate electromagnetic radiation in the blue or green or red spectral range, or in the UV range or in the IR range. During operation, the active layer, or the laser bar, may generate radiation in the spectral range of between 370 nm and 550 nm, such as in the spectral range of between 370 nm and 470 nm, inclusive.

According to at least one embodiment, the radiation-emitting device comprises an optical waveguide having a core, a cladding, an entry face and an exit face. The waveguide is configured to guide radiation, which enters the waveguide through the entry face, inside the core to the exit face. The core is enclosed by the cladding at least on two opposite sides. The cladding may consist of a different material than the core. The cladding is, in particular, applied directly on the core. The cladding may comprise a layer or a layer sequence. The core may consist of a solid or liquid material.

The entry face and the exit face may be planar faces and/or faces running perpendicularly with respect to a main extent direction of the core. The entry face and/or the exit face may be formed by the core or a coating on the core.

According to at least one embodiment, the radiation-emitting device comprises a heat sink having a mounting side. The heat sink may comprise or consist of metal or ceramic or a metal-ceramic layer structure. For example, the heat sink comprises or consists of: SiC, AlN, Cu, CuW. For example, the heat sink comprises a DCB (Direct Copper Bond) structure, for example consisting of an AlN or SiC layer between two copper layers.

The mounting side is a side of the heat sink on which components, such as the waveguide and/or the laser bar, are mounted, for example adhesively bonded or soldered. The mounting side is for example planar. The mounting side may be formed from one of the materials mentioned above.

According to at least one embodiment, the waveguide is applied on the mounting side of the heat sink. In particular, the waveguide is fastened, for example soldered or adhesively bonded, on the mounting side of the heat sink.

According to at least one embodiment, the cladding is arranged at least above and below the core in relation to the mounting side. In other words, the cladding is arranged at least between the mounting side and the core and on a side of the core facing away from the mounting side. The cladding is a different element to the heat sink and may consist of a different material than the heat sink. In an embodiment, the cladding covers the side of the core facing away from the heat sink and its side facing toward the heat sink respectively to at least 75% or at least 80% or fully. The cladding of the waveguide may bear directly on the mounting side or be fastened thereon via a connecting means, for example adhesive or solder material.

According to at least one embodiment, the device is configured so that, during operation, the laser radiation of the laser bar impinges on the entry face of the waveguide and passes from there into the core. For example, the main beam direction of the laser radiation when impinging on the entry face makes an angle of at most 45° or at most 30° or at most 10° with a normal of the entry face.

In an embodiment, the waveguide comprises only a single core, into which the laser radiation of all emitting individual emitters of the laser bar is coupled during operation. As an alternative, it is also conceivable for the waveguide to comprise a plurality of cores separated from one another.

According to at least one embodiment, the core comprises a conversion element which converts the laser radiation into secondary radiation during operation. The core may consist of the conversion element or be formed by the conversion element only in sections. The conversion element comprises for example a conversion material, also referred to as a phosphor, which converts the laser radiation into secondary radiation. The secondary radiation in this case has, in particular, a longer wavelength than the laser radiation. The waveguide may be configured so that the radiation coming from the laser bar is converted partially or fully in the waveguide by the conversion element.

According to at least one embodiment, the waveguide is configured to guide the laser radiation and/or the secondary radiation inside the core as far as the exit face by reflection at the interface between the cladding and the core. The radiation may be guided inside the core predominantly along the mounting side. In particular, the laser radiation is guided along a main extent direction of the core. Subsequently, at least the secondary radiation emerges from the exit face. In particular, at least 90% or all of the secondary radiation emerging from the waveguide emerges from the waveguide in the region of the exit face. In an embodiment, the laser radiation is reflected several times at the interface between the core and cladding while propagating through the waveguide.

For example, the laser radiation and/or the secondary radiation is contained in the core by total internal reflection. The cladding then may have a lower refractive index than the core for the laser radiation and/or the secondary radiation. As an alternative, the cladding may be formed from a material which is reflective for the laser radiation and/or secondary radiation. For example, the reflectance of the cladding for the laser radiation and/or secondary radiation is then at least 90% or at least 95%.

In an embodiment, the radiation emerging from the exit face is light in the visible spectral range, such as white light. The radiation emerging from the exit face may be for the most part, for example to at least 75% or at least 95% or fully, formed by the secondary radiation. The proportion of laser light harmful to the human eye may be kept low.

The light-emitting device is suitable, for example, for use in projectors or headlamps, in particular front headlamps of vehicles.

In at least one embodiment, the radiation-emitting device comprises a laser bar for emitting laser radiation, and a waveguide having a core, a cladding, an entry face and an exit face. The device furthermore comprises a heat sink having a mounting side. The waveguide is applied on the mounting side of the heat sink, the cladding being arranged at least above and below the core in relation to the mounting side. The device is configured so that, during operation, the laser radiation impinges on the entry face of the waveguide and passes from there into the core. The core comprises a conversion element which converts the laser radiation into secondary radiation during operation. The waveguide is configured to guide the laser radiation and/or the secondary radiation inside the core as far as the exit face by reflection at the interface between the cladding and the core.

For light sources, in particular for the generation of white light, light-emitting diodes (LEDs), optionally together with a conversion element, are mostly used nowadays. Often, GaN LEDs having an emission maximum at approximately 450 nm are used. Losses occur in LEDs. Particularly in GaN LEDs, an efficiency decrease (droop) occurs at high currents.

A laser bar as a primary light source may be now used. Laser bars have high optical output power densities of, for example, more than 10 000 kW/cm² and exhibit no efficiency losses at high currents. Since all individual emitters in the laser bar are formed by the same semiconductor body, they are rigidly aligned with one another and do not subsequently need to be aligned with one another. Complicated focusing systems, such as individual lenses or prisms, which are adjusted for each individual laser, may therefore be obviated. With the laser bar, it is thus possible to focus a laser spot with a very high luminance onto a conversion element without great adjustment effort.

The implementation of a conversion element in a core of the waveguide offers the advantage that the laser radiation remains substantially confined in the core and a high efficiency is thereby achieved for the conversion into secondary radiation. In particular, by distributing the conversion element along the entire extent of the core, the conversion may be distributed over the entire extent. This is advantageous in respect of the evolution of heat and quenching in the conversion element. The heat nevertheless occurring during the conversion can be dissipated efficiently by using the heat sink.

According to at least one embodiment, a lateral extent of the core, measured parallel to or along the mounting side, is greater than a vertical extent of the core measured perpendicularly with respect to the mounting side. For example, the lateral extent of the core is at least three times or at least five times or at least ten times or at least 20 times as great as the vertical extent. In an embodiment, the waveguide is arranged, fastened and supported by the heat sink along the entire lateral extent of the core on the mounting side. The vertical extent of the core is for example between 50 μm and 150 μm inclusive, for example about 100 μm.

The conversion material of the conversion element is for example distributed homogeneously in the core along a large part, for instance at least 75% or 90%, of the lateral extent of the core. In this way, the evolution of heat inside the core is advantageously distributed over a large area and can thus be dissipated efficiently via the heat sink.

Along the vertical extent, the conversion material may be distributed homogeneously or inhomogeneously.

According to at least one embodiment, the core is in the form of a platelet. That is to say, the core comprises two planar main faces running parallel or substantially parallel to one another, the extents of which are respectively greater, for example at least three times or at least 5 times or at least ten times or at least 20 times as great as the distance between them. In an embodiment, the main faces run parallel or almost parallel to the mounting side. The waveguide itself may also be in the form of a platelet. By the platelet-like configuration, large-area bonding to the heat sink may be carried out, which is advantageous in respect of the removal of heat.

The cladding is applied at least onto the two main faces of the platelet-like core. A first section of the cladding then covers one main face. A second section of the cladding covers the other main face. In the case of a platelet-like core, the interfaces between the main faces of the core and the two sections of the cladding are respectively planar. Transverse sides of the core, extending transversely or perpendicularly with respect to the main faces, may likewise be covered by sections of the cladding.

The main faces of the core may have triangular, rectangular, square, round or hexagonal shapes. The two main faces of the core may be equally large and identically shaped within the scope of production tolerances.

The exit face and/or the entry face may be formed on the transverse sides of the core. The exit face and/or the entry face may be smaller than a main face, for example at most half as large or at most ⅕ or at most 1/10 or at most 1/20 as large as the main face.

According to at least one embodiment, the conversion element extends constantly over the entire vertical extent of the core, the vertical extent being measured perpendicularly with respect to the mounting side. In particular, the conversion material is then distributed homogeneously in the core along the vertical direction.

According to at least one embodiment, an inner region of the core is free of the conversion element. An outer region, facing toward the cladding, of the core is formed by the conversion element. In particular one or both main faces of the core are for the most part or entirely formed by the conversion element and the inner region between the two main faces is free of the conversion element.

No conversion of the laser radiation takes place in the inner region. The inner region extends, for example, continuously and without interruptions over the entire lateral extent of the core. The vertical extent of the inner region, measured perpendicularly with respect to the mounting side, is for example at least 50% or at least 75% of the vertical extent of the entire core. The part of the core that forms the inner region is for example formed by a carrier, for example consisting of sapphire, GaN, AlN or SiC.

By the configuration of the core with an inner region and an outer region, conversion of the laser radiation occurs only in the region of the cladding. This may be advantageous in respect of the evolution of heat and the removal of heat.

According to at least one embodiment, the entry face and the exit face run transversely or perpendicularly with respect to the mounting side of the heat sink. As an alternative, only the entry face or only the exit face may run perpendicularly with respect to the mounting side. It is furthermore possible for the entry face and/or the exit face to run parallel to the mounting side.

According to at least one embodiment, the exit face is arranged transversely or perpendicularly with respect to the entry face. The normal vectors of the entry face and of the exit face may run parallel or almost parallel to the mounting side and transversely or perpendicularly with respect to one another.

According to at least one embodiment, the cladding comprises a metal layer and/or a dielectric layer and/or a semiconductor layer. For example, the cladding comprises a layer of Ag or Al. It is furthermore possible for the cladding to comprise a plurality of dielectric layers alternately having a higher and lower refractive index. In particular, the cladding then forms a Bragg mirror for the laser radiation and/or secondary radiation.

It is furthermore conceivable for the region of the cladding between the core and the heat sink to comprise or consist of a metal layer and for the region of the cladding on the side of the core facing away from the heat sink to comprise or consist of one or more dielectric layers. Through the region of the cladding between the core and the heat sink, heat can then be removed particularly efficiently to the heat sink.

According to at least one embodiment, the laser bar, or the semiconductor body of the laser bar, is based on $Al_nIn_{1-n-m}Ga_mN$, where $0 \leq n \leq 1$, $0 \leq m \leq 1$ and $m+n \leq 1$.

According to at least one embodiment, the conversion element comprises a conversion material and a matrix material. The conversion material is embedded in the matrix material. For example, the matrix material is AlN or glass. The matrix material may be crystalline, amorphous and/or polycrystalline. The conversion material may, for example, be a rare earth-doped garnet or oxynitride or aluminate or aluminum oxynitride or orthosilicate or thiogallate or alkaline-earth sulfide or alkaline-earth silicon nitride or a combination thereof.

Instead of embedding conversion material in matrix material, the conversion element may also consist of a pressed powder of the conversion material or of the sintered conversion material. In particular, the conversion element is then a ceramic consisting of the conversion material.

According to at least one embodiment, the conversion element comprises an epitaxially grown semiconductor structure, for example based on In, Ga, Al, As, P, N and/or combinations thereof. For example, the semiconductor structure comprises one or more quantum wells and/or quantum dots. The semiconductor structure of the conversion element may be based on a II-VI or III-V semiconductor material. The laser radiation is absorbed in the semiconductor structure, so that electron-hole pairs are formed, which subsequently recombine. The secondary radiation is formed during this recombination. Since laser radiation is used, semiconductor structures without doping can be used, which reduces the loss due to nonradiative recombination.

The semiconductor structure of the conversion element may be grown on a growth substrate, the growth substrate forming part of the core of the waveguide. The growth substrate is for example AlN, GaN or SiC. The growth substrate may form the aforementioned carrier of the inner region of the core.

The waveguide and the conversion element may be configured so that UV laser radiation is fully converted. For example, the conversion element then comprises blue, green and red conversion materials. Blue laser radiation may be converted only partially. For example, the conversion element for this purpose comprises green and red conversion materials as well as scattering elements in order to disrupt the coherence of the remaining blue laser radiation.

According to at least one embodiment, the entry face is formed by a coating which is transmissive for the laser radiation and reflective for the secondary radiation. This prevents secondary radiation from leaving the waveguide through the entry face. The exit face may be formed by a coating which is transmissive for the secondary radiation but nontransmissive for the laser radiation. This prevents harmful laser radiation from leaving the waveguide through the exit face. The coatings may be formed by layer systems having a plurality of dielectric layers.

According to at least one embodiment, the laser bar is arranged on the same heat sink as the waveguide. The device is thereby formed compactly. As an alternative, however, it is also conceivable for the laser bar to be arranged on a different heat sink than the waveguide. The heat sinks of the waveguide and of the laser bar are then, for example, not directly connected to one another.

According to at least one embodiment, the device comprises a plurality of laser bars. All features disclosed above and below in relation to a laser bar are also disclosed for each further laser bar of the device.

According to at least one embodiment, the waveguide comprises a plurality of entry faces. All features disclosed above and below in connection with an entry face are also disclosed for each further entry face.

Each laser bar is in particular uniquely, such as biuniquely, assigned one entry face, in such a way that during operation, the laser radiation of the laser bar impinges on the assigned entry face of the waveguide and passes from there into the core of the waveguide. The use of a plurality of laser bars allows scaling of the output power.

According to at least one embodiment, during operation, a first laser bar generates and emits laser radiation of a first wavelength range and a second laser bar generates and emits laser radiation of a second wavelength range different to the first wavelength range. For example, the first laser bar generates and emits laser radiation in the UV range, particularly in the range of between 375 nm and 425 nm inclusive, and the second laser bar generates and emits laser radiation in the blue spectral range, particularly in the range of between 430 nm and 470 nm inclusive. For example, a plurality of first and second laser bars are arranged alternately around the waveguide. By the use of a plurality of different laser bars and corresponding conversion materials in the conversion element, a white light source having a high luminance and a high color rendering index can be produced. In an embodiment, when using UV laser radiation and blue laser radiation, both Eu-doped and Ce-doped conversion materials are used in order to avoid thermal quenching.

According to at least one embodiment, the entry faces are respectively formed by a coating. The coating of the entry faces assigned to the first laser bar is transmissive for the laser radiation of the first wavelength range and reflective for the laser radiation of the second wavelength range. The coating of the entry face assigned to the second laser bar is transmissive for the laser radiation of the second wavelength range and reflective for the laser radiation of the first wavelength range. In an embodiment, the coatings are in addition respectively reflective for the secondary radiation which is formed by conversion of the laser radiations.

Here, "reflective" means that the reflectance for the relevant radiation is at least 90% or at least 95%. "Transmissive" in the present case means that the transmittance for the relevant radiation is at least 80% or at least 90%.

According to at least one embodiment, the entry faces assigned to the first and second laser bars lie opposite one another in a lateral direction parallel to the mounting side. The waveguide is arranged between these two entry faces in the lateral direction. The two entry faces may run parallel to one another. The exit face then may run transversely with respect to the two entry faces. The use of the wavelength-selective coatings on the entry faces prevents the laser radiation coming from the first laser bar from being output through the entry face of the second laser bar, and vice versa.

BRIEF DESCRIPTION OF THE DRAWINGS

Further advantageous embodiments and refinements of the radiation-emitting device may be found in the exemplary embodiments described below in connection with the figures. Elements which are the same or similar, or which have the same effect, are provided with the same references in the figures. The figures and the size proportions of the elements represented in the figures with respect to one another are not to be considered as being true to scale. Rather, individual elements, in particular layer thicknesses, may be represented exaggeratedly large for better representability and/or for better understanding.

FIGS. 1 to 5 show exemplary embodiments of the radiation-emitting device in a cross-sectional view.

DETAILED DESCRIPTION

Figure 1:
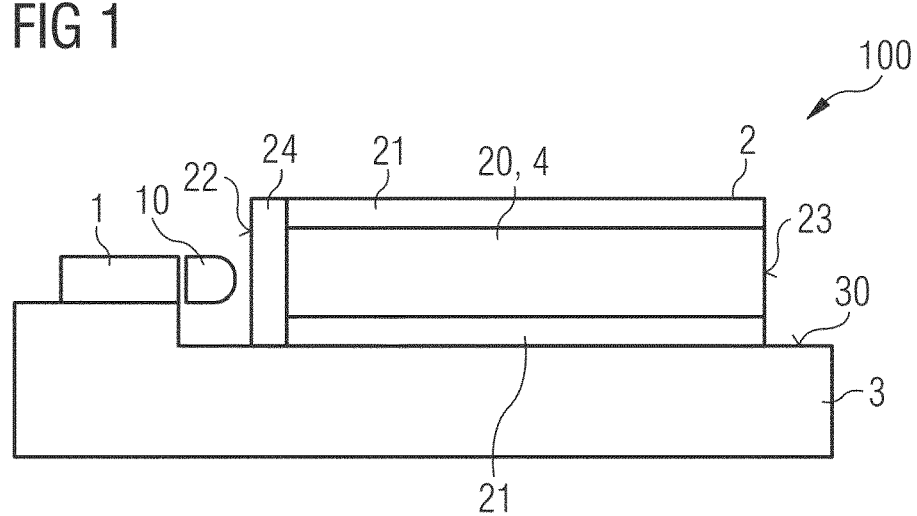

FIG. 1 shows a first exemplary embodiment of the radiation-emitting device 100 in a cross-sectional view. The device 100 comprises a heat sink 3, for example consisting of SiC, AlN, Cu or CuW. A waveguide 2 is arranged on a mounting side 30 of the heat sink 3. The waveguide 2 comprises a core 20 and a cladding 21. The cladding 21 covers the core 20 on a side facing toward the heat sink 3 and on a side facing away from the core 20. The core 20 here has, for example, the shape of a platelet with two opposite main faces, which are parallel to one another and parallel to the mounting side 30, to which the cladding 21 is adjacent.

A laser bar 1, which comprises a multiplicity of individual emitters (not represented), is furthermore arranged on the heat sink 3, some or all of these individual emitters emitting laser radiation during operation of the laser bar 1. In the present case, the laser bar 1 is based for example on AlInGaN and emits laser radiation in the blue spectral range or in the UV range during operation. The laser bar 1 is followed by optics 10, for example in the form of a lens or lens system. The optics 10 focus the laser radiation of the laser bar 1 onto an entry face 22 of the waveguide 2. The entry face 22 here runs perpendicularly with respect to the mounting side 30 of the heat sink 3. The entry face 22 is formed in the present case by a coating 24 which is transmissive for the laser radiation of the laser bar 1.

During operation of the device 100, the laser radiation impinges on the entry face 22 and in this case has a main beam direction which runs parallel or almost parallel to the mounting side 30. Through the entry face 22, the laser radiation is then coupled into the core 20 of the waveguide 2. The core 20 of the waveguide 2 is in the present case formed entirely by a conversion element 4. The conversion element 4 comprises for example a matrix material, for example in the form of glass or AlN, having particles of a conversion material which are embedded therein. The conversion material is, for example, Ce:YAG. As an alternative, the conversion element 4 may also be sintered conversion material or pressed conversion material.

The conversion material 4 is configured to convert the laser radiation into secondary radiation. The waveguide 2 is configured so that the laser radiation, and may also the secondary radiation, are guided inside the core 20 in the direction of an exit face 23 of the waveguide 2 by reflection at the interface between the core 20 and the cladding 21. In the present case, the exit face 23 lies opposite the entry faces 22 in the lateral direction, parallel to the mounting side 30, and likewise runs transversely with respect to the mounting side 30. In an embodiment, all of the laser radiation is converted into secondary radiation during the guiding of the laser radiation through the core 20. The secondary radiation then emerges from the waveguide through the exit face 23. The emerging secondary radiation may be white light.

In order to achieve reflection at the interface between the cladding 21 and the core 20, the cladding 21 may comprise a material which is reflective for the laser radiation and/or the secondary radiation, for example a metal or a plurality of dielectric layers, which form a Bragg mirror. As an alternative, it is also conceivable for the material of the cladding 21 to be transparent for the laser radiation and/or the secondary radiation, but for a refractive index of the cladding 21 to be less than that of the core 20, so that total internal reflection takes place at the interface. The cladding 21 is, in particular, formed from a different material than the heat sink 3. For example, in the present case the cladding 21 is formed from a metal, such as Ag or Al, in the region between the heat sink 3 and the core 20. On the side of the core 20 facing away from the heat sink 3, the cladding 21 may be formed from one or more dielectric layers.

The coating 24, which forms the entry face 22, of the waveguide 2 may be reflective for the secondary radiation so that secondary radiation does not emerge from the waveguide 2 through the entry face 22.

Figure 2:
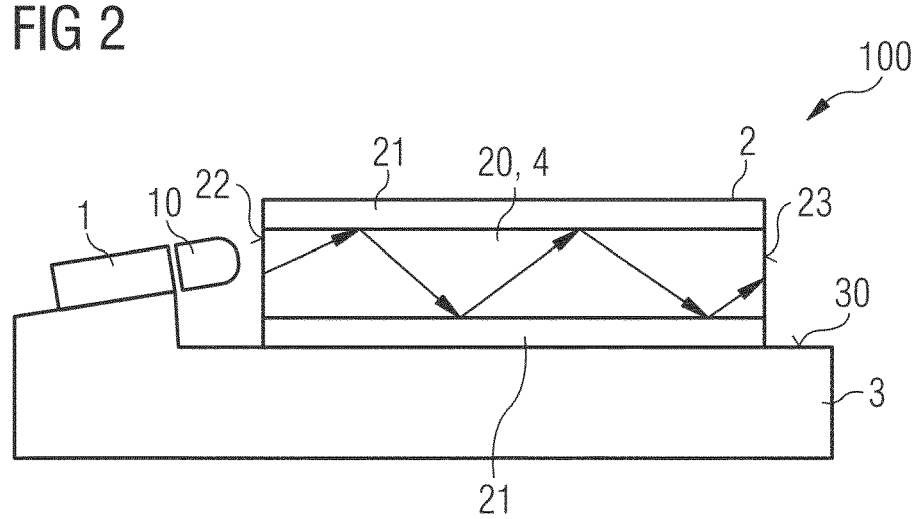

FIG. 2 shows a second exemplary embodiment of the radiation-emitting device 100. In contrast to the exemplary embodiment of FIG. 1, here the entry face 22 of the waveguide 2 is formed not by a coating but by the core 20 itself. Furthermore, the laser radiation does not impinge on the entry face 22 while being parallel to the mounting side 30, but is coupled into the waveguide 22 while being purposely tilted with respect to the mounting side 30, so that the path length inside the core 20 is increased and an even greater proportion of the laser radiation is thereby converted into secondary radiation.

Figure 3:
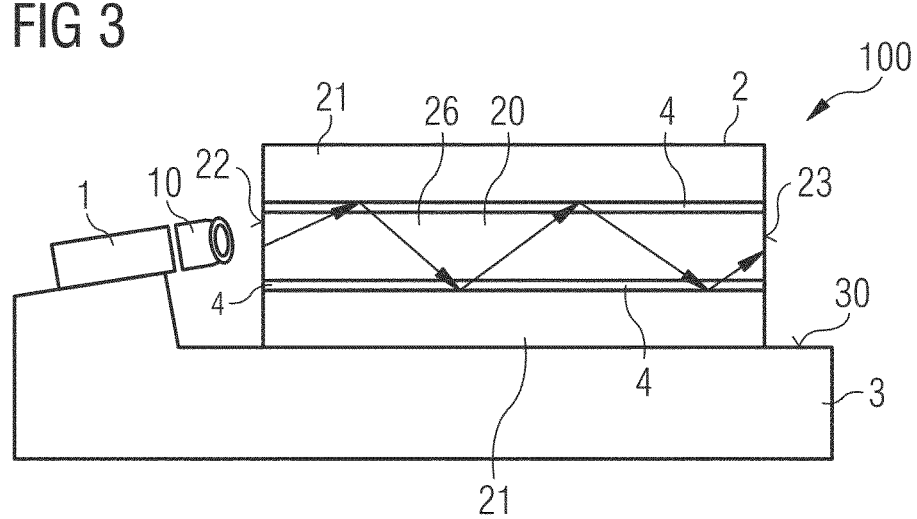

FIG. 3 shows a third exemplary embodiment of the radiation-emitting device 100. Unlike in the two previous exemplary embodiments, here the core 20 of the waveguide 2 is not formed entirely by the conversion element 4. Rather, the core 20 comprises an inner region which is free of the conversion element 4. An outer region of the core 20, facing toward the cladding 21 and adjacent to the cladding 21, is formed by the conversion element 4. The inner region of the core 20 may be filled with air or may be formed by a carrier 26, for example consisting of sapphire, AlN, GaN or SiC.

The conversion element 4 comprises, for example, semiconductor structures having quantum wells or quantum dots.

FIG. 4 shows a fourth exemplary embodiment of the radiation-emitting device 100. The exemplary embodiment is similar to that of FIG. 3. Here, however, the carrier 26 protrudes out from the cladding 21 in the lateral direction, parallel to the mounting side 30. The entry face 22 and the exit face 25 run parallel or substantially parallel to the mounting side 30. In these regions, the carrier 26 is not covered by the cladding 21. The laser radiation of the laser bar 1 impinges perpendicularly or almost perpendicularly on the entry face 22, as in the previous exemplary embodiments. The carrier 26 comprises deflecting structures, which deflect the laser radiation in a direction parallel to the mounting side 30. In the region of the core 20 which is enclosed by the cladding 21, the laser radiation is then converted into secondary radiation by means of the conversion element 4. In a region of the carrier 26 that protrudes laterally from the cladding 21, the secondary radiation is thereupon deflected by means of deflecting structures back in the direction away from the mounting side 30 and emerges from the waveguide 2 through the exit face 23.

In FIG. 4, the exit face 23 of the waveguide 2 is formed by a coating 25 which is reflective for the laser radiation and transmissive for the secondary radiation.

FIG. 5 shows a fifth exemplary embodiment of the radiation-emitting device 100. Here, the core 20 of the waveguide comprises a growth substrate 26, for example consisting of sapphire or SiC, having a semiconductor structure epitaxially grown thereon which comprises a plurality of quantum wells. The semiconductor structure having the quantum wells forms the conversion element 4.

Figure 6:
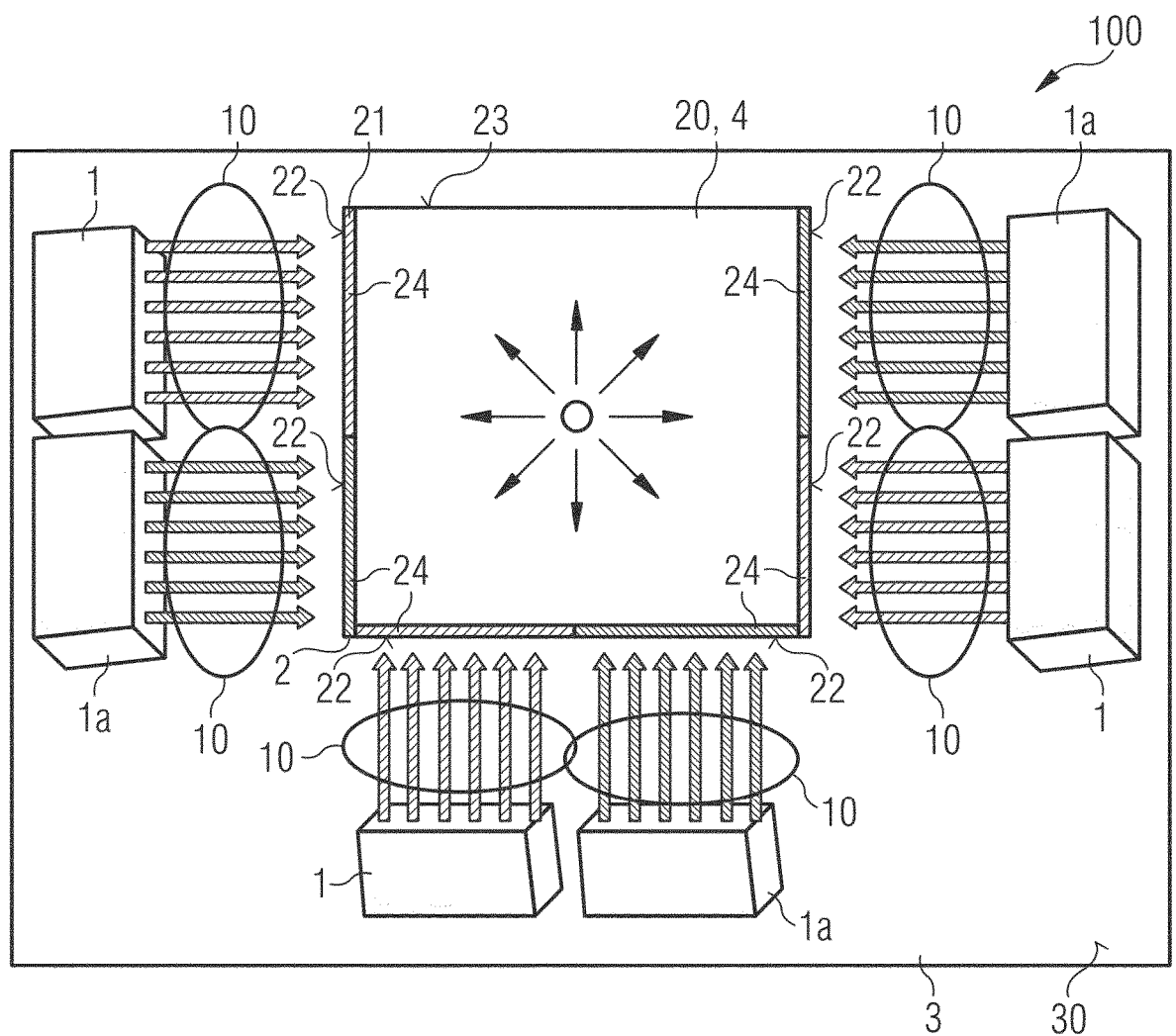
FIGS. 6 to 10 show exemplary embodiments of the radiation-emitting device in a plan view.

FIG. 6 shows a sixth exemplary embodiment of the radiation-emitting device, now in a plan view of the mounting side 30 of the heat sink 3. Here, it can be seen that the waveguide 2 is a platelet-like element. It can furthermore be seen that the transverse sides of the core 20 that run transversely with respect to the mounting side 30 are coated with the cladding 21. On the transverse sides of the core 20, the cladding 21 is formed at least partially by coatings 24 which are transmissive for particular laser radiations but nontransmissive for the secondary radiation.

FIG. 6 furthermore shows that the device 100 comprises a plurality of laser bars 1, 1a. First laser bars 1 in this case emit laser radiation of a first wavelength range, in the present case for example UV radiation, and second laser bars 1a emit radiation in a second wavelength range, in the present case for example in the blue spectral range. Each of the laser bars 1, 1a is biuniquely assigned an entry face 22 of the waveguide 2. The entry faces 22 are in this case formed respectively by the aforementioned coating 24.

The coatings 24 assigned to the first laser bars 1 are transmissive for the laser radiation of the first wavelength range and reflective for the laser radiation of the second wavelength range. The coatings 24 assigned to the second laser bars 1a are transmissive for the laser radiation of the second wavelength range and nontransmissive for the laser radiation of the first wavelength range. In this way, the proportion of laser radiation which emerges unconverted from the waveguide is reduced.

It can also be seen in FIG. 6 that a first laser bar 1 is arranged opposite a second laser bar 1a in a lateral direction parallel to the mounting side 30, so that the first laser bar 1 emits laser radiation in the direction of the second laser bar 1a and the second laser bar 1a emits laser radiation in the direction of the first laser bar 1. The waveguide 2 is arranged between these mutually opposite laser bars 1, 1a. The exit face 23, through which the secondary radiation emerges from the waveguide 2, here runs perpendicularly with respect to some of the entry faces 22. In the exemplary embodiment, the conversion element 4 comprises for example Eu-doped and Ce-doped conversion materials.

Figure 7:
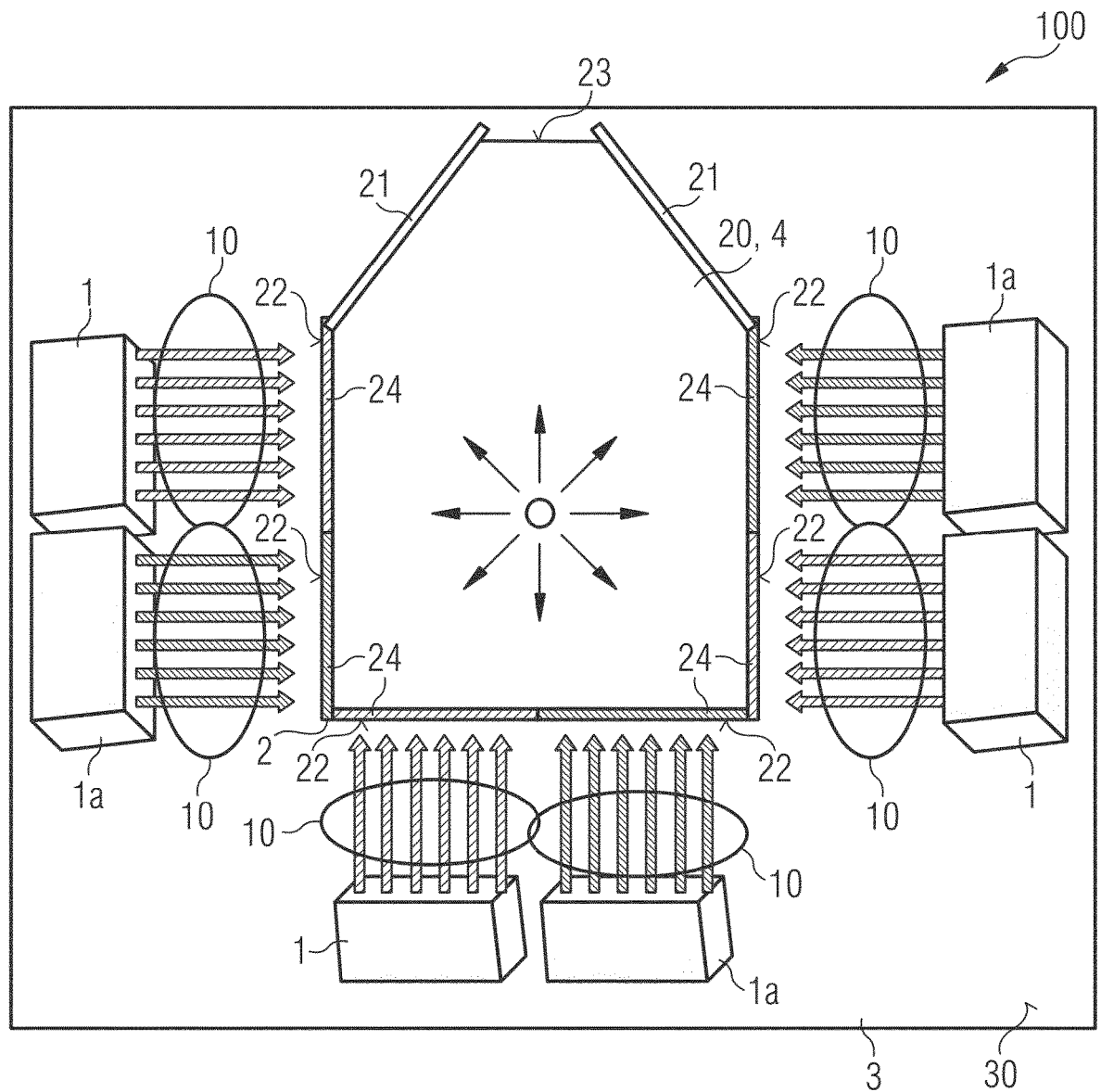

FIG. 7 shows a seventh exemplary embodiment of the radiation-emitting device 100. Here, the waveguide 2 comprises a section in which the lateral extents of the waveguide and of the core decrease continuously as far as the exit face 23, so that focusing of the secondary radiation takes place.

Figure 8:
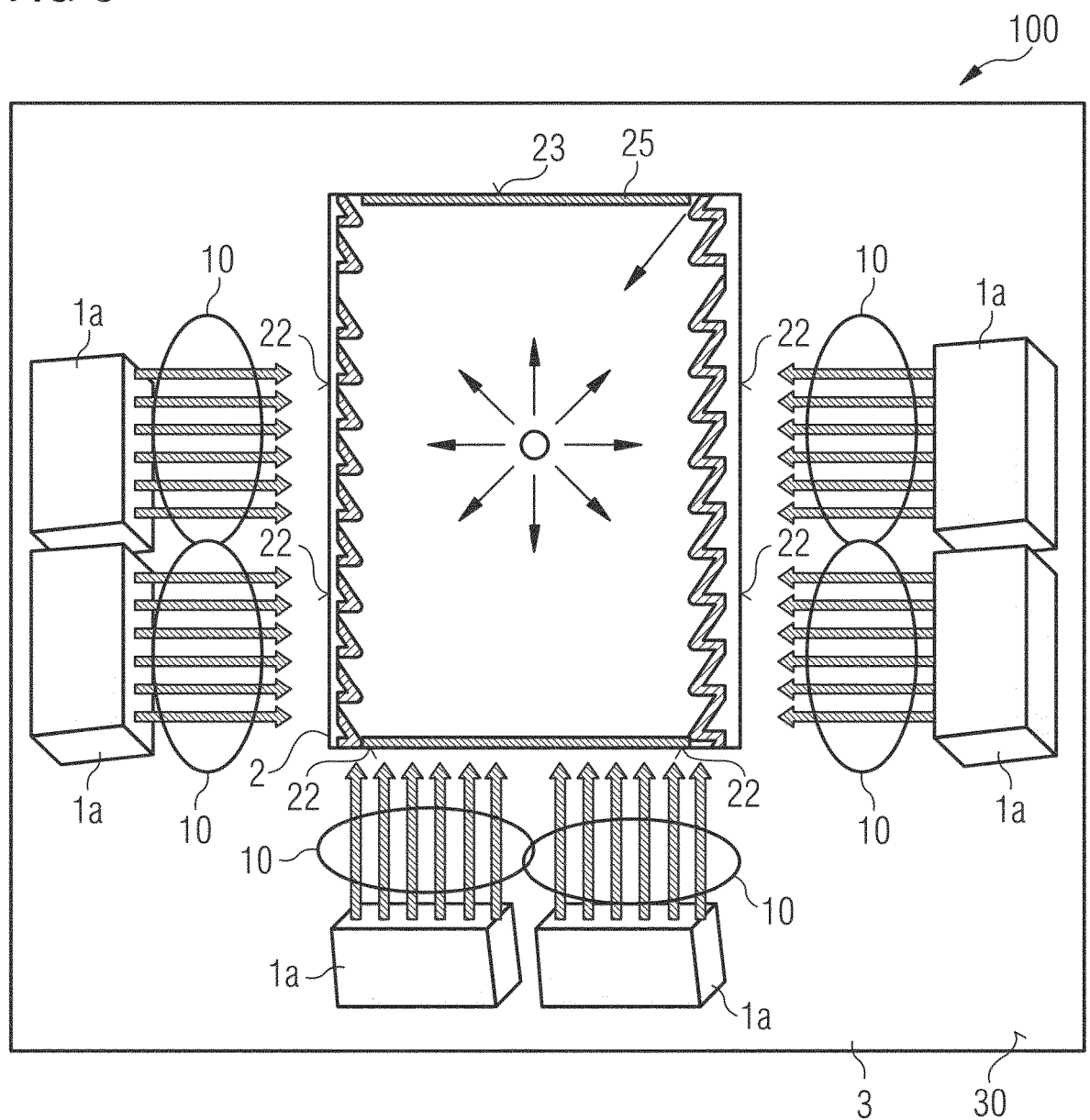

FIG. 8 shows an exemplary embodiment in which a plurality of laser bars are again used, but this time only second laser bars 1a, which respectively emit for example laser radiation in the blue spectral range, are employed. The waveguide 2 comprises structures which deflect the laser radiation inside the core 20 in the direction of the exit face 23. The exit face 23 is formed here with a coating 25 which reflects the blue laser radiation and transmits the secondary radiation.

Figure 9:
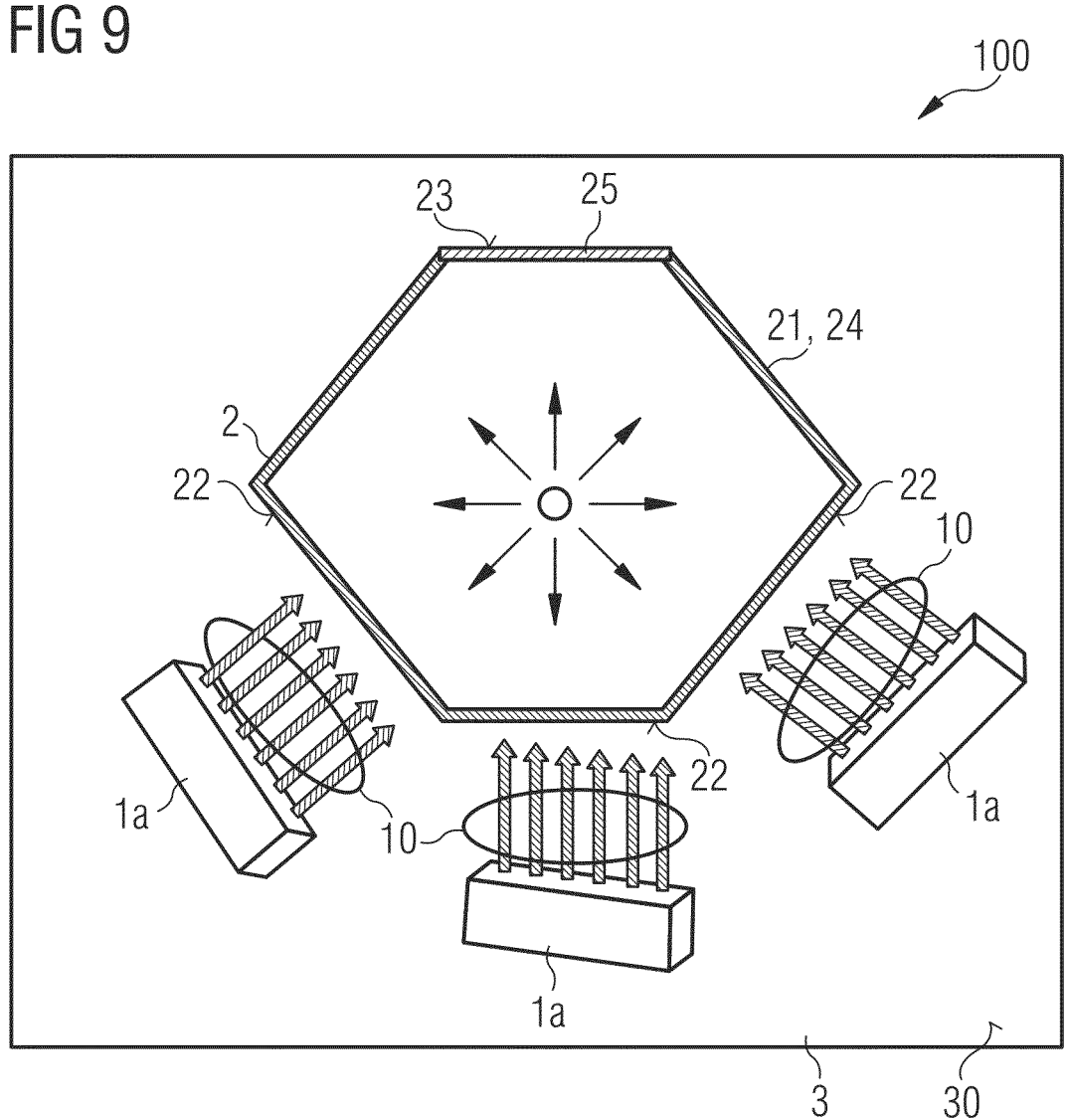

FIG. 9 shows a ninth exemplary embodiment of the radiation-emitting device 100. Here, the waveguide 2 has the geometrical shape of a hexagon as seen in a plan view. In the previous exemplary embodiments, the waveguide 2 and the core 20 have the geometrical shape of a rectangle in a plan view.

Figure 10:
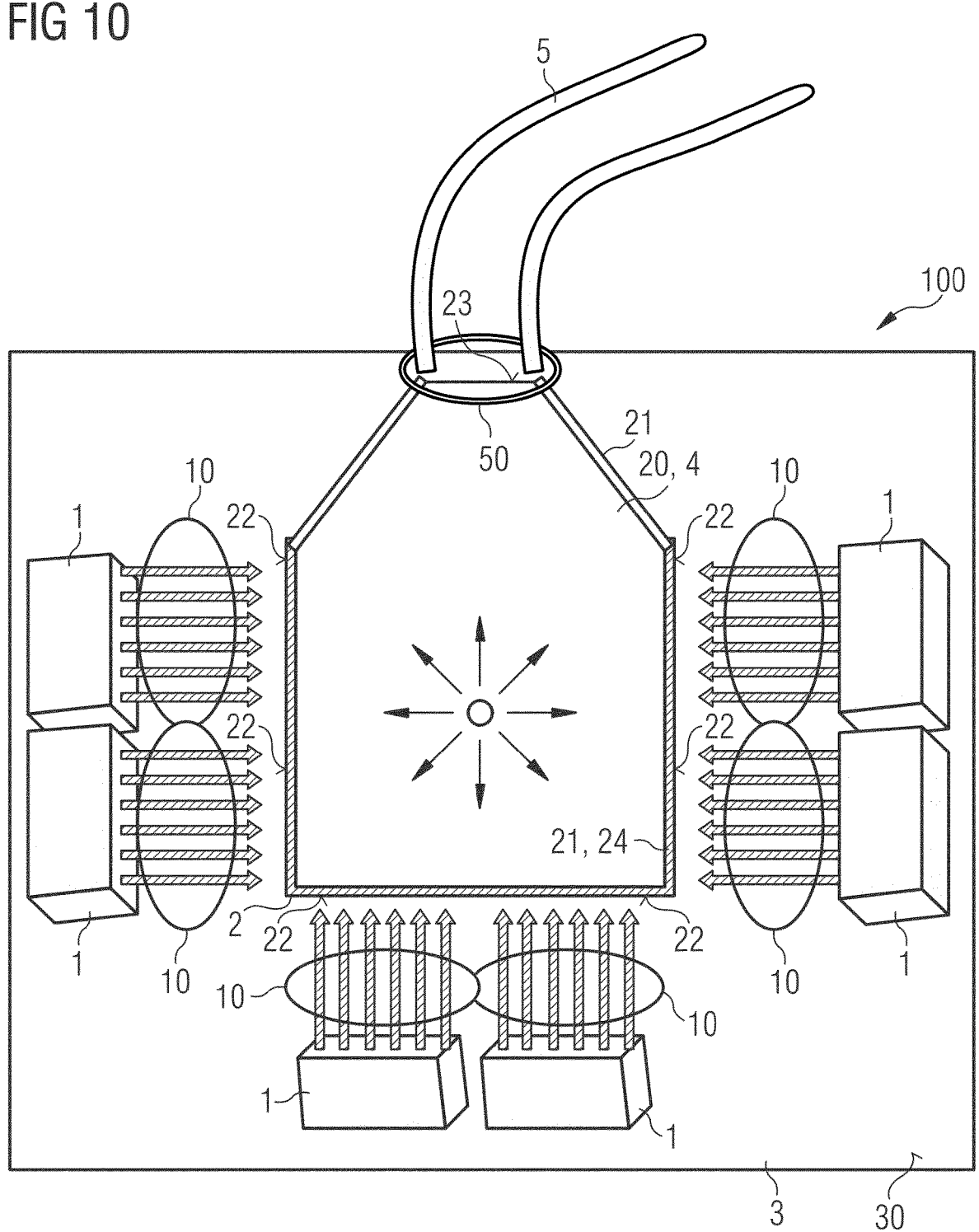

In the tenth exemplary embodiment of FIG. 10, the waveguide 2 is formed in a similar way as in FIG. 7. In this exemplary embodiment, for example, only first laser bars 1 which emit UV radiation are used. The exit face 23 of the waveguide 2 is followed by an optical fiber 5. A lens 50 for focusing the radiation emerging from the exit face 23 is arranged between the optical fiber 5 and the exit face 23. By means of the optical fiber 5, the secondary radiation can be guided to a location at a distance from the exit face 23.

Figure 11:
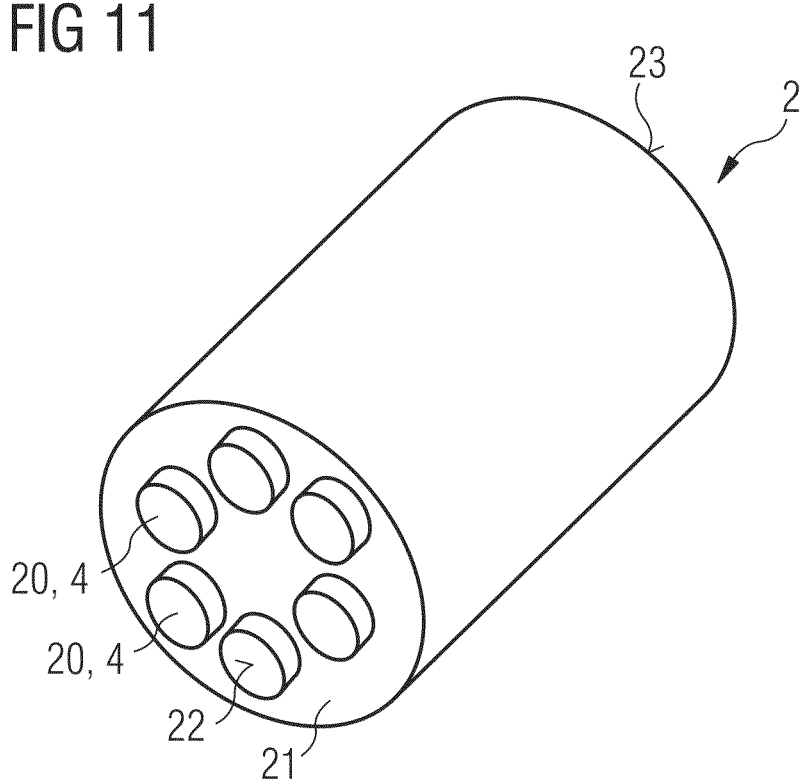
FIGS. 11 and 12 show exemplary embodiments of the waveguide in a perspective view.
Figure 12:
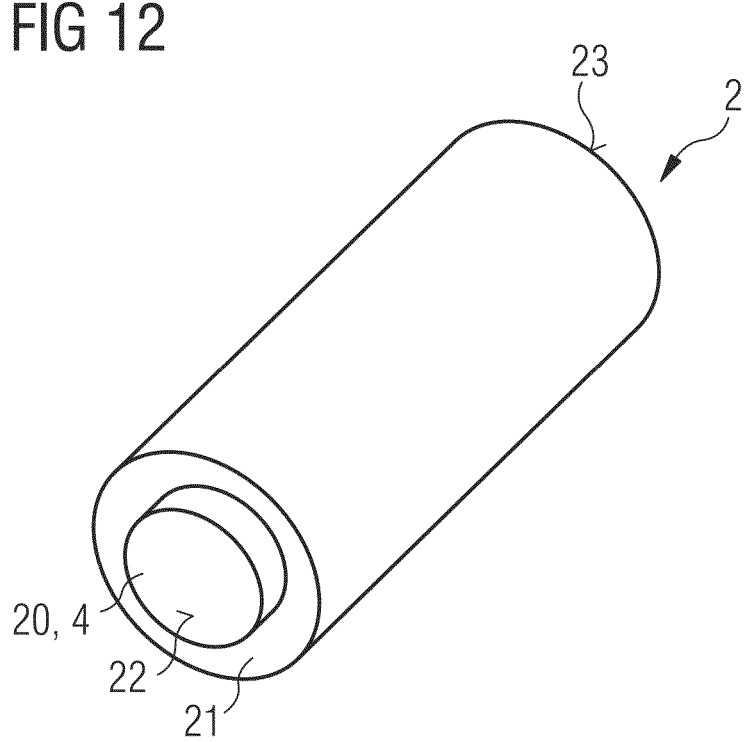

FIGS. 11 and 12 show two exemplary embodiments of a waveguide 2 such as may be used in a device as described here. Unlike the waveguides 2 of the exemplary embodiments above, here the cores 20 are not platelet-like but formed as fibers with a round cross section. The cores 20 are respectively completely enclosed all around by the cladding 21. In FIG. 11, the waveguide 2 comprises a plurality of cores, which are enclosed by a continuous cladding 21 that is formed in one piece. In FIG. 12, the waveguide 2 comprises only a single core 20.

The invention is not restricted by the description with the aid of the exemplary embodiments to this description.

Rather, the invention comprises any new feature and any combination of features, which in particular includes any combination of features in the patent claims, even if these features or this combination are/is not themselves/itself explicitly specified in the patent claims or the exemplary embodiments.

LIST OF REFERENCES 1 laser bar/first laser bar
1a second laser bar
2 waveguide
3 heat sink
4 conversion element
5 optical fiber
10 optics
20 core
21 cladding
22 entry face
23 exit face
24, 25 coating
26 carrier/growth substrate
30 mounting side
50 lens
100 radiation-emitting device

The invention claimed is:

1. A radiation-emitting device comprising:
a laser bar configured to emit laser radiation;
a waveguide having a core, a cladding, an entry face, and an exit face;
a heat sink having a mounting side;
wherein:
the waveguide is applied on the mounting side of the heat sink;
the cladding is arranged at least above and below the core in relation to the mounting side;
the device is configured so that, during operation, the laser radiation impinges on the entry face of the waveguide and passes from there into the core;
the core comprises a conversion element which converts the laser radiation into secondary radiation;
the waveguide is configured to guide the laser radiation and/or the secondary radiation inside the core by reflection at the interface between the cladding and the core;
an inner region of the core comprises a carrier that protrudes from the cladding in both lateral directions parallel to the mounting side;
the carrier comprises a first deflecting structure configured to deflect the laser radiation in a direction parallel to the mounting side; and
a second deflecting structure is configured to deflect the secondary radiation away from the mounting side and through the exit face.

2. The device as claimed in claim 1, wherein a lateral extent of the core, measured parallel to the mounting side, is greater than a vertical extent of the core measured perpendicularly with respect to the mounting side.

3. The device as claimed in claim 1, wherein the core is in the form of a platelet.

4. The device as claimed in claim 1, wherein the conversion element extends constantly over the entire vertical extent of the core, measured perpendicularly with respect to the mounting side.

5. The device as claimed in claim 1, wherein:
an inner region of the core is free of the conversion element; and
an outer region, facing toward the cladding, of the core is formed by the conversion element.

6. The device as claimed in claim 1, wherein the entry face and the exit face run transversely with respect to the mounting side of the heat sink.

7. The device as claimed in claim 6, wherein the exit face is arranged transversely with respect to the entry face.

8. The device as claimed in claim 1, wherein the cladding comprises a metal layer, a dielectric layer, a semiconductor layer, or combinations thereof.

9. The device as claimed in claim 1, wherein the laser bar is based on $Al_n In_{1-n-m} Ga_m N$, where $0 \leq n \leq 1$, $0 \leq m \leq 1$ and $m+n \leq 1$.

10. The device as claimed in claim 1, wherein:
the conversion element comprises a conversion material and a matrix material consisting of glass or AlN, in which the conversion material is embedded; or
the conversion element consists of pressed or sintered conversion material; or
the conversion element comprises an epitaxially grown semiconductor structure.

11. The device as claimed in claim 1, wherein the entry face is formed by a coating which is transmissive for the laser radiation and reflective for the secondary radiation.

12. The device as claimed in claim 1, wherein the laser bar is arranged on the heat sink.

13. The device as claimed in claim 12, wherein the laser bar is arranged on the same heat sink as the waveguide.

14. The device as claimed in claim 1, wherein:
the device comprises a plurality of laser bars;
the waveguide comprises a plurality of entry faces;
each laser bar is uniquely assigned one entry face in such a way that, during operation, the laser radiation of the laser bar impinges on the assigned entry face of the waveguide and passes from there into the core.

15. The device as claimed in claim 14, wherein:
a first laser bar generates laser radiation of a first wavelength range; and
a second laser bar generates laser radiation of a second wavelength range different to the first wavelength range.

16. The device as claimed in claim 15, wherein:
the entry faces are respectively formed by a coating;
the coating of the entry face assigned to the first laser bar is transmissive for the laser radiation of the first wavelength range and reflective for laser radiation of the second wavelength range;
the coating of the entry face assigned to the second laser bar is transmissive for the laser radiation of the second wavelength range and reflective for laser radiation of the first wavelength range.

17. The device as claimed in claim 16, wherein the entry faces assigned to the first and second laser bars lie opposite one another in a direction parallel to the mounting side.

18. The device as claimed in claim 1, wherein the laser radiation does not impinge on the entry face while being parallel to the mounting side.

* * * * *